G. N. PALMER,

Assignor to C. N. La Dow.

2 Sheets—Sheet 1.

Horse-Rake and Hay-Spreader.

No. 9,050. Reissued Jan. 20, 1880.

WITNESSES

Wm A. Skinkle.

Geo W. Breck.

Charles La Dow. ASSIGNEE OF INVENTOR

George N. Palmer.

By his Attorneys

Baldwin, Hopkins & Peyton

N. PETERS, PHOTO-LITHOGRAPHER, WASHINGTON, D. C.

2 Sheets—Sheet 2.

G. N. PALMER,

Assignor to C. N. La Dow.

Horse-Rake and Hay-Spreader.

No. 9,050. Reissued Jan. 20, 1880.

WITNESSES

Wm A. Skinkle.

Geo W Breck.

Charles La Dow. Assignee of

INVENTOR

George N. Palmer.

By his Attorneys

Baldwin, Hopkins & Peyton

N. PETERS, PHOTO-LITHOGRAPHER, WASHINGTON, D. C.

UNITED STATES PATENT OFFICE.

GEORGE N. PALMER, OF GREENE, N. Y., ASSIGNOR TO CHARLES LA DOW.

HORSE-RAKE AND HAY-SPREADER.

SPECIFICATION forming part of Reissued Letters Patent No. 9,050, dated January 20, 1880.

Original No. 65,113, dated May 28, 1867. Application for Reissue filed December 9, 1879.

*To all whom it may concern:*

Be it known that I, GEORGE N. PALMER, of Greene, in the county of Chenango and State of New York, have invented certain new and useful Improvements in Combined Horse-Rake and Hay-Tedding Machine, of which improvements the following is a full, clear, and exact description, reference being had to the accompanying drawings, making a part of this specification, and in which—

Figure 1:
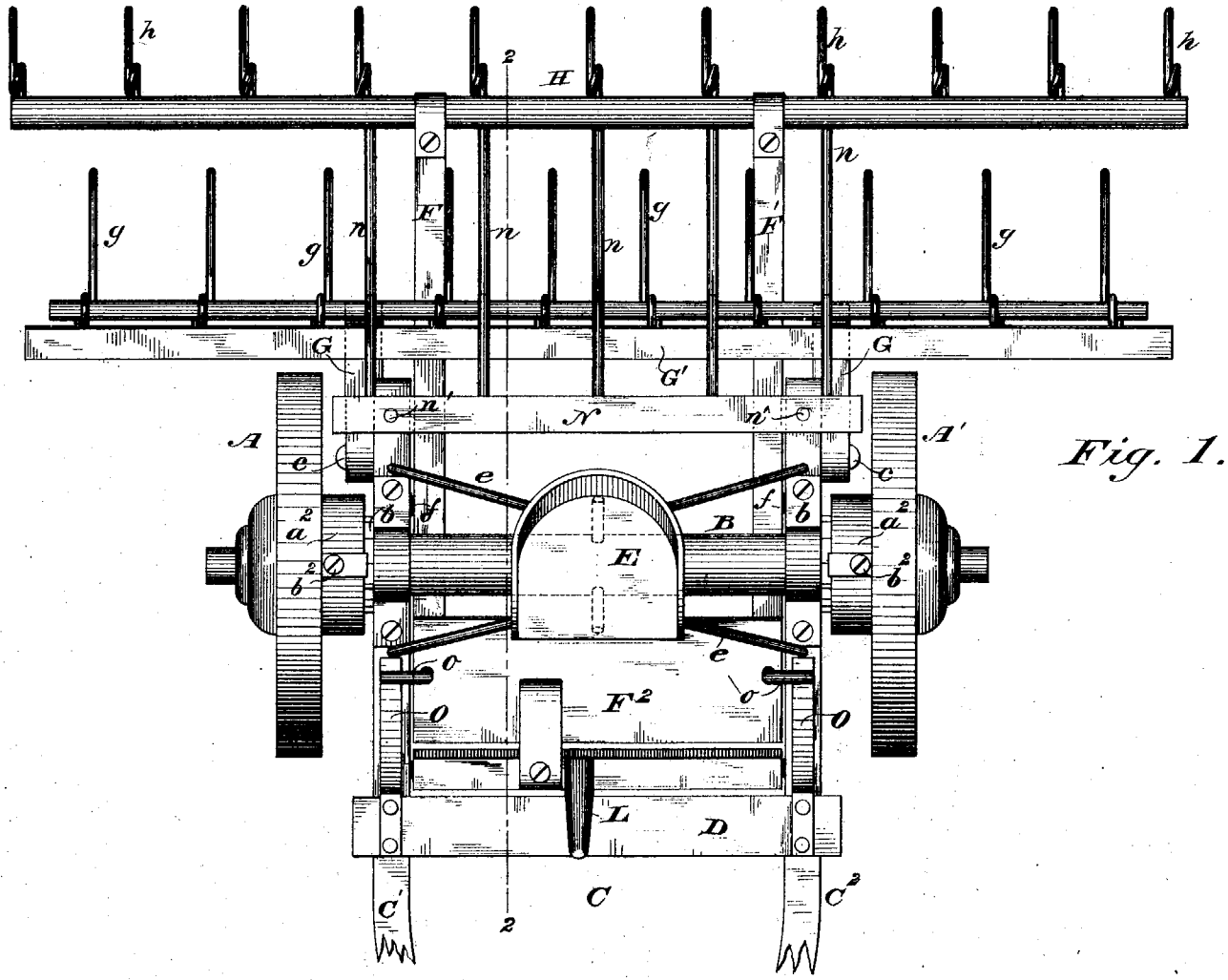
Figure 2:
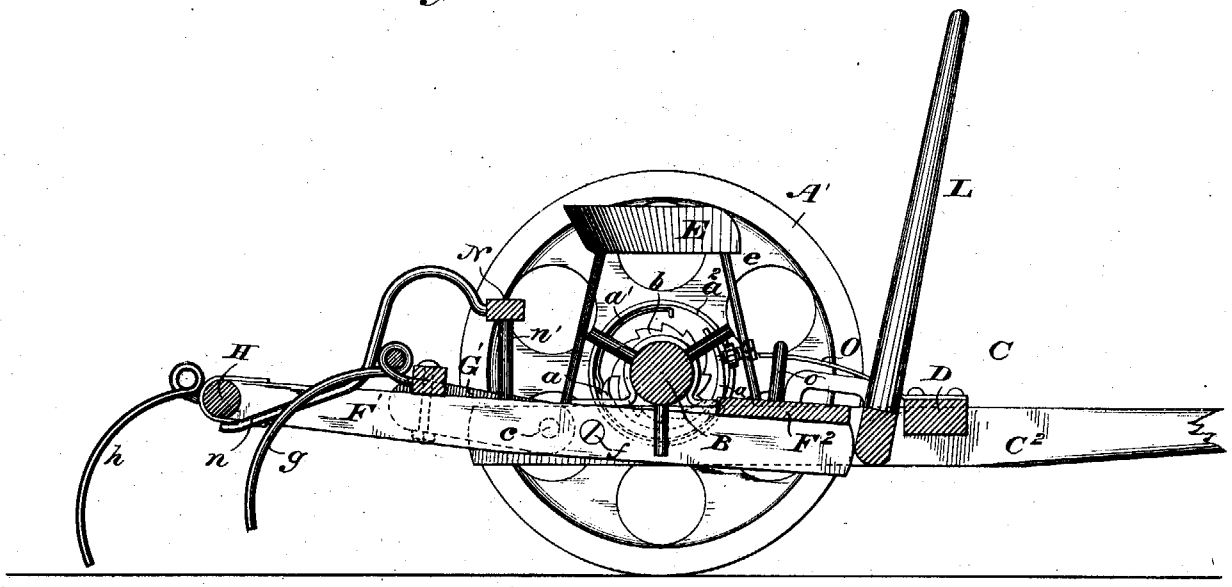

Figure 1 represents a plan or top view of a machine embodying all the improvements herein claimed; Fig. 2, a vertical longitudinal section therethrough on the line 1 1 of Fig. 1.

The invention set forth in this specification relates to additional improvements on a combined horse-rake and hay-tedding machine for which Letters Patent No. 51,473 were granted to me December 12, 1865.

The first part of my invention relates to mechanism for raising and lowering the teeth. Its objects are to hold the rake-teeth down to their work with a yielding pressure, and to compensate shocks caused by the vibrations of the rake-frame, which ends I attain by combining a main frame, a rake-frame capable of rocking on pivots thereon, and springs, which always tend to depress the rake-teeth.

The object of the next part of my invention is to increase the efficiency of the operation of the apparatus by diminishing the power required to rock the rake-frame on its pivots, which end I attain by balancing the rake-frame, which rocks on pivots on the main frame, and interposing springs between the main and rake frames to depress the rake-teeth.

The object of the next part of my invention is to enable the operator from his seat on the machine to adjust the depressing mechanism of the rake-teeth, which end I attain by interposing counterbalancing-springs between the main frame and a rake-frame rocking on pivots thereon, and regulating the tension of said springs by suitable adjusting mechanism.

My improvement further consists in combining a main frame, a balanced rake-frame rocking on pivots thereon, springs to depress the rake-teeth, and a lever to rock said frame to lift the teeth when desired.

The object of the next part of my invention is to utilize the power of both wheels automatically to lift the rake-frame to clear the teeth of matter gathered thereon and quickly to release them to leave them free to resume their normal working position, which ends I attain by combining driving, carrying, or supporting wheels mounted loosely on an axle, backing-ratchets connecting each wheel with its axle, a main frame carried by the axle, a balanced rake-frame rocking on pivots on the main frame, springs interposed between the main and rake frames, which always tend to depress the rake-teeth, and a lifting-cam on the main axle.

The object of the next part of my invention is to raise or lower the rake-teeth rapidly and effectually, which end I attain by combining a main or supporting frame, a rake-frame pivoted thereon, short levers, also pivoted on the main frame, and spring-teeth carried by the short levers and resting on the rake-frame, so that as the rake-frame rocks on its pivots the rake-supporting levers, being of shorter radius, rise more quickly.

My invention further consists in combining a main frame, a rake-frame, their pivot-connections, short levers pivoted to the main frame, spring-teeth carried by a rake-head mounted on the short levers and resting on the rake-frame, and clearer-teeth mounted on the main frame.

The next part of my invention relates to that class of implements having spring-teeth mounted in gangs, sets, or ranks transversely to the path of the machine and in different vertical planes. Its object is more thoroughly to operate upon the substance traversed, and to allow the teeth of one gang to yield backwardly without interfering with those of the rear gang, which ends I attain by mounting on a supporting-frame gangs, sets, or ranks of spring-teeth, extending transversely across the path of the machine, and with the teeth of one set working in the spaces between those of the other.

My invention further consists in combining a main frame, a rake-frame rocking on pivots thereon, a rake-head and its spring-teeth mounted on said rake-frame, short levers pivoted on the main frame, and a second rake-head and its spring-teeth mounted on the short levers and resting on the supplementary frame.

The next part of my invention relates to the method of connecting the driving-wheels and driving-axle. Its object is to enable the driver readily to throw either or both of the driving-wheels into or out of gear, and yet to protect the backing-ratchets from clogging or injury, which ends I attain by inclosing the backing-ratchets in a casing, which also protects the disengaging mechanism.

The object of the next part of my invention is to provide an adjustable stop to regulate the vibrations of a rake-frame vibrated by the revolution of the carrying-wheels, to which end my invention consists in combining main carrying or supporting wheels, a main frame, a rake-frame, mechanism for vibrating the rake-frame by the revolution of the wheels, pivot-connections between the frames, and an adjustable stop interposed between the frames.

To enable those skilled in the art to construct or use my improvements, I will now describe the construction and operation of a machine embodying them, with reference to the drawings.

The drawings show two main carrying, driving, or supporting wheels, A A′, revolving loosely on an axle, B, carrying ratchet-wheels *b* on each side thereof. A dog or pawl, *a*, pivoted on each wheel-hub, engages, when desired, with the teeth of its ratchet, in contact with which it is normally held by a spring, *a′*. These backing-ratchets, it will be observed, are arranged on the inner side of the driving-wheels, and they are inclosed in a casing, $a^2$, through which thumb-screws $b^2$ operate on the lever ends of the pawls, as seen in Fig. 1, to throw the pawls into and out of gear with the ratchets.

The pawls, it will be observed, are shown as curved to conform to the shape of the casing, and are pivoted intermediate of their lengths.

By this mode of construction the backing-ratchets are held in gear to rotate the axle when moving forward, while the ratchets may readily be thrown out of gear, so as to permit the wheels to revolve loosely on their axle.

By incasing the ratchets extraneous matter is prevented from being caught and wound up by them.

A main driving axle or shaft, B, revolves in suitable bearings in a main frame, C, shown as consisting of thills or shafts C′ $C^2$, extending behind the axle, arranged at suitable distances apart, parallel to each other and to the carrying-wheels, and connected by suitable cross bars or braces, the front cross-bar, D, being arranged in front of the axle.

The seat E for the driver is shown as located over the main axle and mounted on suitable supports *e*, secured upon the main frame.

A secondary supplementary rocking rake-frame is shown as composed of longitudinal bars or beams F F′, connected and braced in front by a cross-beam, $F^2$, beneath the driver's seat. This frame, it will be observed, extends both in front and rear of the main axle, being connected with the main frame by pivots *f*, which permit it to rock freely vertically.

A rake-head, G′, resting on the beams F F′ of the rocking frame, is mounted on two short levers, G G, connected with the rear ends of the thills by pivots *c*, which permit the short levers to swing vertically, so that by the action of the rocking rake-frame as it rises the spring rake-teeth *g* are thrown upward and backward, being cleared from the hay as they rise by the aid of the clearing-fingers *n*, mounted on the cross-bar N, secured above the main frame by standards *n′*.

An adjustable rake head or shaft, H, carrying spring-teeth *h*, is mounted on the rocking frame F F′ in rear of the lifting rake-head just described, in the manner shown in my patent above mentioned.

It will be observed that by the organization shown the weight of the rocking frame preponderates to the rear of the pivots on which it rocks, and the teeth tend normally constantly to bear upon the ground. This tendency is overcome, however, by weighting the cross-bar $F^2$, so as to balance the rake-frame on its pivots.

To counterbalance and regulate the movements of the balanced rocking frame, springs O, secured upon the main frame, press upwardly upon screw-hooks *o*, projecting laterally from the rocking frame, the pressure of the springs being regulated by adjusting the screw-hooks. The adjustment of these hooks also serves to give more or less vertical movement to the rocking rake frame. Where the crop is light but little motion is required. Where it is heavy a greater range of motion is necessary.

The springs may be secured to the shaft-timbers C′ $C^2$ or whiffletree-bar D, their resilience being sufficient to keep the front of the rocking frame elevated, so as to hold the rake in working position, and to bring said rocking frame in range with the lifting-cam on the main axle, or within reach of the rocking-lever L, pivoted on the frame within easy reach of the driver when in his seat; or the rocking of this balanced rake-frame may be accomplished by the driver pressing with his foot on the main cross-bar or foot-piece $F^2$. The rake-teeth are thus normally constantly held upon the ground with a yielding pressure, and when lifted are promptly returned to their work. By this construction shocks caused by the vibrations of the rake-frame are compensated and elasticity imparted to the working of the machine.

The operation of the machine will readily be understood from the foregoing description.

Having thus described my improvements, what I claim as new, and desire to secure by Letters Patent, is—

1. The combination, substantially as herein-before set forth, of a main frame, a rake-frame, their pivot-connections, rake-teeth mounted on the rake-frame, and spring mechanism interposed between said frames, which tends constantly to depress the rake-teeth.

2. The combination, substantially as hereinbefore set forth, of the supporting-wheels, the main frame, the rake-frame, spring-teeth carried thereby, the pivot-connections of these frames, and the counterbalancing-springs interposed between said frames.

3. The combination, substantially as hereinbefore set forth, of the supporting-wheels, the main frame, the rake-frame, the pivot-connections of these frames, the counterbalancing-springs interposed between them, and mechanism for regulating the tension of the springs.

4. The combination, substantially as hereinbefore set forth, of the supporting-wheels, the main frame, the rake-frame, the pivot-connections of these frames, the counterbalancing-springs to depress the teeth, and the lever to lift them.

5. The combination, substantially as hereinbefore set forth, of the supporting-wheels, the axles, the backing-ratchets, the main frame, the rake-frame, the pivot-connections of these frames, the counterbalancing-springs, and the lifting-cam.

6. The combination, substantially as hereinbefore set forth, of the main frame, the rake-frame, the pivot-connections of these frames, the short levers pivoted on the main frame, the pivots of said short levers being in rear of the pivots of the rake-frame, and the rake-head and its teeth mounted on the short levers and resting upon the rake-frame, whereby the rake-teeth are rapidly elevated by the vibration of said frame.

7. The combination, substantially as hereinbefore set forth, of the main frame, the rake-frame, the pivot-connections of these frames, the short levers pivoted on the main frame, the pivots of said short levers being in rear of the pivots of the rake-frame, the rake-head and its teeth mounted on the short levers and resting on the rake frame, and the clearer-teeth mounted on the main frame.

8. The combination, substantially as hereinbefore set forth, of a supporting-frame and series of yielding spring-teeth mounted thereon, the teeth in one series being arranged to work in the spaces between the teeth of the next series.

9. The combination, substantially as hereinbefore set forth, of a supporting-frame and gangs, sets, or ranks of spring-teeth extending transversely across the path of the machine in different vertical planes, and with the teeth of one set working in the spaces between those of the other.

10. The combination, substantially as hereinbefore set forth, of a main frame, a rake-frame, the pivot-connections of these frames, the short levers pivoted to the main frame, the rake-head and its spring-teeth mounted on the short levers, and the second rake-head and its spring-teeth mounted on the rake-frame proper.

11. The combination, substantially as hereinbefore set forth, of the main driving or carrying wheels, the pawls and their springs pivoted on the wheel-hubs, the axle, the ratchet-wheels carried thereby, the disengaging devices, and the casing.

12. The combination, substantially as hereinbefore set forth, of the main carrying or supporting wheels, a main frame, a rake-frame, pivot-connections between said frames at a point intermediate the ends of the rake-frame, mechanism for vibrating the rake-frame by the revolution of one or both of the carrying-wheels, and an adjustable stop, independent of the tripping mechanism, interposed between the frames.

GEO. N. PALMER.

Witnesses:
H. V. RANSOM,
MICHAEL MCENERY.